US011973736B2

(12) United States Patent
Gustof et al.

(10) Patent No.: US 11,973,736 B2
(45) Date of Patent: Apr. 30, 2024

(54) DEVICE, SYSTEM AND METHOD FOR RESOLVING MISUNDERSTANDINGS ON TEXT OR AUDIO CHANNELS VIA OPENING A VIDEO CHANNEL

(71) Applicant: MOTOROLA SOLUTIONS, INC., Chicago, IL (US)

(72) Inventors: Grzegorz Gustof, Myslenice (PL); Pawel Wilkosz, Myslenice (PL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 18/014,458

(22) PCT Filed: Jul. 28, 2020

(86) PCT No.: PCT/PL2020/050055
§ 371 (c)(1),
(2) Date: Jan. 4, 2023

(87) PCT Pub. No.: WO2022/025778
PCT Pub. Date: Feb. 3, 2022

(65) Prior Publication Data
US 2023/0198931 A1    Jun. 22, 2023

(51) Int. Cl.
*H04L 51/18* (2022.01)
*H04L 51/02* (2022.01)
(Continued)

(52) U.S. Cl.
CPC .............. *H04L 51/23* (2022.05); *H04L 51/02* (2013.01); *H04L 51/046* (2013.01); *H04L 51/18* (2013.01);
(Continued)

(58) Field of Classification Search
CPC ....... H04L 51/02; H04L 51/04; H04L 51/046; H04L 51/063; H04L 51/066; H04L 51/21;
(Continued)

(56) References Cited

U.S. PATENT DOCUMENTS 8,407,049 B2   3/2013   Cromack et al.
9,462,112 B2   10/2016  Woolsey et al.
(Continued)

FOREIGN PATENT DOCUMENTS

KR   20080085002 A   9/2008
KR   20080095002 A   9/2008

OTHER PUBLICATIONS

"International Search Report", dated Mar. 26, 2021, issued in corresponding PCT Application No. PCT/PL2020/050055, Filed Jul. 28, 2020.
(Continued)

*Primary Examiner* — Johnny B Aguiar
(74) *Attorney, Agent, or Firm* — PERRY + CURRIER, INC.

(57) ABSTRACT

A device, method and system for resolving misunderstandings on channels is provided. A device monitors communications on a channel between communication devices. The device determines a misunderstanding in the communications. The device determines information to resolve the misunderstanding. The device controls one or more of the communication devices to provide the information to resolve the misunderstanding.

12 Claims, 6 Drawing Sheets

(51) Int. Cl.
*H04L 51/046* (2022.01)
*H04L 51/21* (2022.01)
*H04L 51/216* (2022.01)
*H04L 51/23* (2022.01)
*H04L 65/401* (2022.01)

(52) U.S. Cl.
CPC .............. *H04L 51/21* (2022.05); *H04L 51/216* (2022.05); *H04L 65/401* (2022.05)

(58) Field of Classification Search
CPC ....... H04L 51/216; H04L 51/18; H04L 51/23; H04L 12/1822; H04L 65/40; H04L 65/401; H04L 65/4015; H04L 65/1069; H04L 65/1089; H04L 65/1093; H04L 67/14; H04L 67/141; H04L 67/143; G06F 40/30
See application file for complete search history.

(56) References Cited

U.S. PATENT DOCUMENTS

| | | | | |
|---|---|---|---|---|
| 2004/0193557 | A1* | 9/2004 | Olsen | G06F 40/253 706/1 |
| 2007/0300165 | A1* | 12/2007 | Haveliwala | G06F 3/0482 715/810 |
| 2008/0126481 | A1* | 5/2008 | Chakra | H04L 67/53 709/204 |
| 2010/0235760 | A1 | 9/2010 | Goh | |
| 2013/0007142 | A1* | 1/2013 | Rosenberg | G06Q 10/107 709/206 |
| 2013/0304455 | A1* | 11/2013 | O'Sullivan | G06F 40/169 704/9 |
| 2014/0195621 | A1 | 7/2014 | Rao Dv | |
| 2015/0215747 | A1 | 7/2015 | Kemmerer, Jr. et al. | |
| 2016/0182412 | A1* | 6/2016 | Kabbes | G06Q 10/10 709/206 |
| 2018/0226070 | A1* | 8/2018 | Gorzela | G06V 40/174 |
| 2019/0068532 | A1* | 2/2019 | Horling | H04L 51/18 |
| 2019/0188582 | A1 | 6/2019 | Kephart et al. | |
| 2019/0287199 | A1 | 9/2019 | Messerges et al. | |
| 2020/0065728 | A1* | 2/2020 | Wilson | G06N 5/01 |
| 2020/0099800 | A1 | 3/2020 | Noguchi et al. | |

OTHER PUBLICATIONS

Oteo Mayayo, Carlota, Examiner, "International Search Report", mailed Mar. 26, 2021, issued in corresponding PCT Application No. PCT/PL2020/050055, Filed Jul. 28, 2020.

* cited by examiner

DEVICE, SYSTEM AND METHOD FOR RESOLVING MISUNDERSTANDINGS ON TEXT OR AUDIO CHANNELS VIA OPENING A VIDEO CHANNEL

BACKGROUND OF THE INVENTION

Communications devices of public safety officers often exchange data in groups via channels such as talkgroups. Such communications may be of different formats, such as text, voice, video and the like and a format of a channel (e.g. text, voice, video) may hence place restrictions on types and/or formats of data exchanged on a channel. Each may lead to misunderstandings of different or similar types, which may cause problems when the public safety officers are responding, for example, to a public safety incident, and the like.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
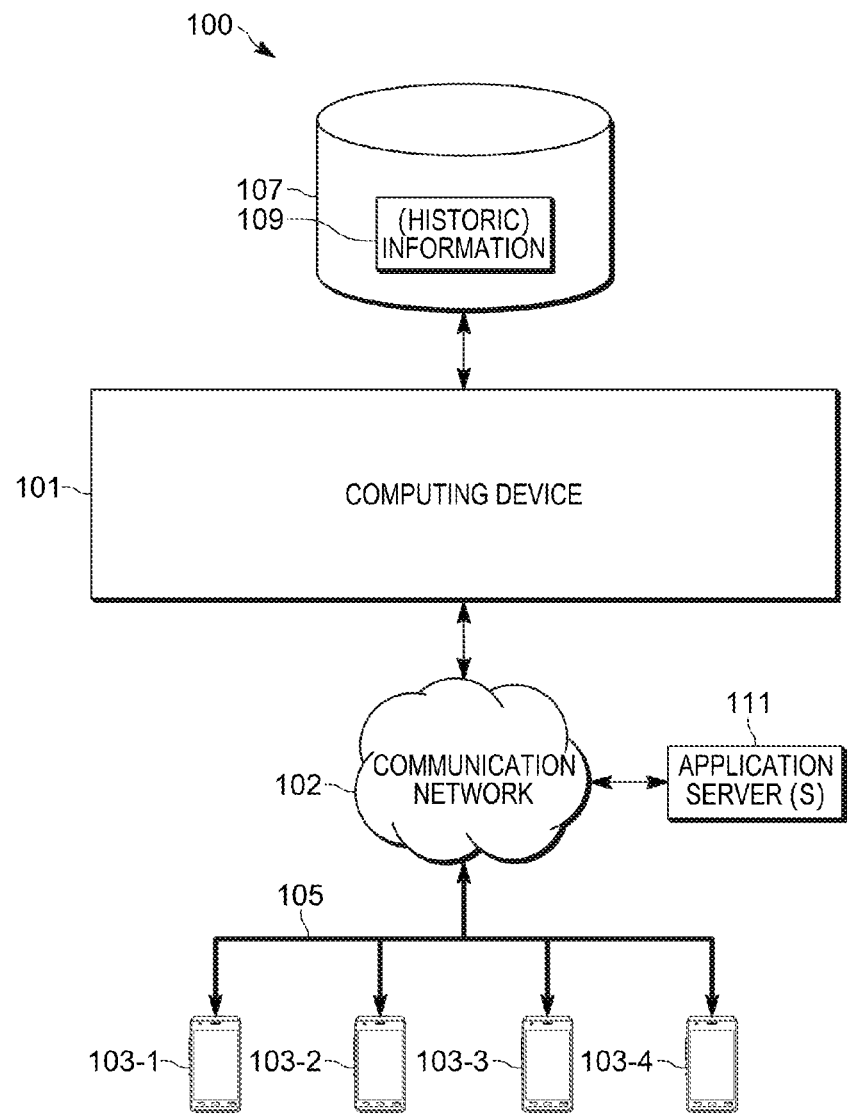
FIG. 1 is an example system for resolving misunderstandings on channels, in accordance with some examples.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Communications devices of public safety officers often exchange data in groups via channels such as talkgroups. Such communications may be of different formats, such as text, voice, video and the like and a format of a channel (e.g. text, voice, video) may hence place restrictions on types and/or formats of data exchanged on a channel. Each may lead to misunderstandings of different or similar types, which may cause problems when the public safety officers are responding, for example, to a public safety incident, and the like.

For example, on text chats (e.g. text and/or Multimedia Messaging Service (MMS) chats) on text-based channels misunderstandings may occur as facial reactions, body language, and the like, from participants are not generally viewable; similarly, on group text chats replies and/or reactions to questions and/or statements may be delayed as many intervening texts may occur (e.g. as texts on several topics may be occurring). Similarly, in voice calls, on audio-based channels, misunderstandings may occur as facial reactions, body language, and the like, from participants are not generally viewable. Indeed, even in video calls, on video-based channels, misunderstandings may occur as information that might be available when participants are talking face-to-face, for example as the environment around the participants may not be viewable on the video call and/or other tools for resolving misunderstandings may not be available (e.g. such as whiteboards, and like). Similarly, in both audio and video calls, environmental noise may obscure audio being exchanged on a respective channel.

Hence, provided herein is a device which monitors communications on channels between communication devices and determines when misunderstandings occur in the communications. As understood herein, the term "misunderstanding" is directed towards identifying confusion and/or misinterpretation and/or miscommunications and/or communication problems in conversations, and the like, represented in, and/or identifiable from, communication data, such as text data, audio data, video data, and the like, and/or any type of communication data which may be provided on channels being used by communication devices to communicate. For example, the device may use machine learning models, and the like, trained to identify misunderstandings in text data, audio data, video data, and the like. In particular examples, such misunderstandings may be identified on the basis of repeated and/or ambiguous and/or contradictory descriptions and/or descriptors (e.g. in text data, audio data and/or video data) of an object, person, location, etc., in communications on a channel. However, such misunderstandings may be identified in any suitable manner, as described in more detail below. When a misunderstanding is identified, the device generally determines information to resolve the misunderstanding and controls one or more of the communication devices to provide the information to resolve the misunderstanding.

In a particular example, text data, audio data, video data, and the like, may be exchanged between communication devices on a channel; the device provided herein determines that a description and/or a descriptor (e.g. words) of a location is being provided on the channel via a particular communication device (e.g. via text data and/or audio data), but the description and/or descriptor is imprecise and/or keeps being repeated in different ways. Hence, the device may determine that a misunderstanding is occurring. To resolve the misunderstanding, the device may determine geographic coordinates, and the like, at which the particular communication device is located (e.g. by querying the particular communication device for such geographic coordinates and/or by receipt of the geographic coordinates in metadata from the channel), and provide such geographic coordinates on the channel (e.g. via text data or audio data). Alternatively, the device may look up the geographic coordinates to determine an address at which the particular communication device is located and provide the address on the channel (e.g. via text data or audio data). Alternatively, the device may cause a map application to be opened on one or more of the communication devices to show the location and/or retrieve a street-view of the location via a map server, and the like, and cause one or more of the communication devices to show the street-view, for example as image data. Alternatively, the device may open an additional channel between a subset of the communication devices, the additional channel having a format different from the channel, the additional channel to assist at resolving the misunderstanding; for example, when communications over an initial channel are text-based, the additional channel may support video such that communications over the additional channel may show video of the location.

An aspect of the present specification provides a method comprising: monitoring, at a computing device, communications on a channel between communication devices; determining, at the computing device, a misunderstanding in the communications; determining, at the computing device, information to resolve the misunderstanding; and controlling, via the computing device, one or more of the communication devices to provide the information to resolve the misunderstanding.

Another aspect of the present specification provides a device comprising: a communication unit; and a controller configured to: monitor, via the communication unit, communications on a channel between communication devices; determine a misunderstanding in the communications; determine information to resolve the misunderstanding; and control, via the communication unit, one or more of the communication devices to provide the information to resolve the misunderstanding.

Attention is directed to FIG. 1, which depicts an example system 100 for resolving misunderstandings on channels. The various components of the system 100 are in communication via any suitable combination of wired and/or wireless communication links, and communication links between components of the system 100 are depicted in FIG. 1, and throughout the present specification, as double-ended arrows between respective components; the communication links may include any suitable combination of wireless and/or wired links and/or wireless and/or wired communication networks including, but not limited to, as depicted, a communication network 102 (interchangeably referred to hereafter as the network 102).

The system 100 comprises a computing device 101 in communication with endpoint communication devices 103-1, 103-2, 103-3, 103-4 via the network 102. The computing device 101 is interchangeably referred to hereafter as the device 101. The endpoint communication devices 103-1, 103-2, 103-3, 103-4 are interchangeably referred to hereafter, collectively, as the communication devices 103 (and/or the endpoint communication devices 103) and, generically, as a communication device 103 and/or an endpoint communication device 103.

While not depicted, the communication devices 103 are understood to be operated by respective users and/or operators including, but not limited to, first responders (e.g. police officers, fire fighters, emergency medical technicians, and the like). However the communication devices 103 may be operated by any suitable users and/or operators (referred to hereafter as operators) including, but not limited to, employees of private entities, such as businesses and the like.

While four communication devices 103 are depicted, the system 100 may include more than four communication devices 103 or fewer than four communication devices 103; for example, the system 100 may include as few as two communication devices 103. As depicted, the communication devices 103 comprise mobile devices, however, one or more of the communication devices 103 may comprise other types of communication devices including, but not limited to, non-mobile communication devices, dispatcher communication devices, laptop communication devices, console communication devices, public-safety access point (PSAP) communication devices and/or console communication devices, and the like.

Furthermore, the communication devices 103 may be referred to as "endpoint" communication devices as the communication devices 103 act as endpoints for communications therebetween, for example via a channel 105. While, for simplicity, portions of the channel 105 are depicted as communication links between the communication devices 103 outside of the network 102, it is understood that the channel 105 is being provided via the network 102, and/or infrastructure thereof, and/or any suitable combination of communication networks.

In particular, the communication devices 103 are generally configured to communicate via channels, such as the channel 105, and/or communication channels, including, but not limited to, talkgroups. Indeed, the term "channel" and/or "communication channel", as used herein, includes, but is not limited to, a physical radio-frequency (RF) communication channel, a logical radio-frequency communication channel, a trunking talkgroup (interchangeably referred to herein a "talkgroup"), a trunking announcement group, a VOIP (Voice-over-internet-protocol) communication path, a push-to-talk channel, and the like. Indeed, groups of channels may be logically organized into talkgroups, and/or dynamically allocated into talkgroups, though channels in a talkgroup may be dynamic as the traffic (e.g. communications) in a talkgroup may increase or decrease, and channels assigned to the talkgroup may be adjusted accordingly. Hence, calls and/or communications herein may include, but are not limited to, push-to-talk calls, VOIP calls, cell phone calls, and the like.

Furthermore, such channels may be provided on one or more communication systems and/or networks (e.g. including, but not limited to, the network 102), and may further include arrangements of channels and/or talkgroups in wide area communication networks (WACNs) and/or subgroups thereof (which may also be colloquially referred to as systems); for examples, channels and/or talkgroups may be broadly grouped according to a plurality of wide area communication networks, and further grouped, within a wide area communication network, by systems. However, the channels and/or talkgroups may be arranged and/or grouped in any suitable manner.

The device 101 may generally comprise one or more server devices and/or cloud-based devices and/or call-processing devices, and the like, configured to set-up channels and monitor communications on channels between the communication devices 103. For example, the device 101 may be generally configured to provide call processing services for the communication devices 103, for example to handle requests for calls and/or set up channels between the communication devices 103 accordingly. The device 101 may set up channels between the communication devices 103 by exchanging channel control messages with infrastructure of the network 102 and the communication devices 103.

In the example depicted in FIG. 1 it is understood that the channel 105 has been established between the communication devices 103, and that the device 101 may have set up the channel 105. As such, the communication devices 103 may register with the device 101, for example when turned on and/or powered up, and/or when a suitable messaging application and/or communication application (including, but not limited to, a talkgroup application) at a communication device 103 is executed; such registration may include the communication devices 103 providing an identifier thereof (e.g. a network address, a Media Access Control (MAC) address, and the like) and/or an identifier of an operator thereof (e.g. a badge number, an employee number, and the like) to the device 101.

Furthermore, the device 101 is understood to be monitoring the channel 105 via the network 102 and/or the device 101 is understood to be participant on the channel 105. For example, the device 101 may receive communication data between exchanged the communication devices 103 on the channel 105 including, but not limited to, text data, audio data, video data, and the like. When the communication data includes audio data and/or video data, audio thereof may be converted to text via a speech-to-text module and/or application at the device 101.

Regardless, the device 101 is generally configured to monitor communications (e.g. the communication data) on the channel 105 to determine when misunderstandings occur, and control one or more of the communication devices 103 to provide information to resolve the misunderstanding, as described in more detail below. In some examples, the device 101 may cause an additional channel to be provided between a subset of the communication devices 103 to provide such information to resolve the misunderstanding.

In general, the device 101 may include machine learning algorithms trained to determine one or more of: misunderstandings in communications; and information to resolve the misunderstanding. However, the device 101 may be configured to perform such functionality in any suitable manner, as described in more detail below.

As depicted, the system 100 further comprises a memory 107, in the form of a database, and the like, which may comprise a component of the device 101 and/or the memory 107 may be a component of another device of the system 100 with which the device 101 is in communication (e.g. via the network 102 and/or, as depicted, via a link external to the network 102 and/or in any other suitable configuration). Regardless, it understood that the memory 107 is accessible to the device 101. As depicted, the memory 107 stores information 109, such as historic information, and the like, which may have been previously used to resolve misunderstandings in the past. For example, subsets of the information 109 may be associated with operators of the communication devices 103 (e.g. via identifiers thereof, such as badge numbers, employee numbers, and the like) who previously used particular descriptions and/or descriptors (e.g. words) of persons and/or objects and/or locations, and the like, that previously caused misunderstandings; such subsets of the information 109 may further include information which resolved such misunderstandings. As such, in some examples, the device 101 may access the memory 107 to determine a portion and/or a subset of the information 109 which may be used to resolve a misunderstanding in communications on the channel 105. In some examples, the memory 107 and/or the information 109, may be optional.

As depicted, the system 100 further comprises at least one optional application server 111, in communication with the device 101 and the communication devices 103 via the network 102. The at least one application server 111, interchangeably referred to hereafter as the server 111, comprises a server for providing information for applications (e.g. "apps" at the communication devices 103) upon request from a communication device 103 and/or via the device 101. In particular examples, the server 111 may comprise an address server and/or a map server and/or a street-view server for providing addresses and/or maps and/or street-views of geographic coordinates (e.g., including, but not limited to, Global Positioning System (GPS) coordinates) for corresponding mapping "apps" at the communication devices 103. In other examples, the server 111 may comprise a social media server for providing social media data to corresponding social media "apps" at the communication devices 103. In other examples, the server 111 may comprise a police record server for providing police records to corresponding public-safety incident "apps", and the like, at the communication devices 103. However, the server 111 may comprise any suitable type of application server including, but not limited to, a medical record server, and the like.

Figure 2:
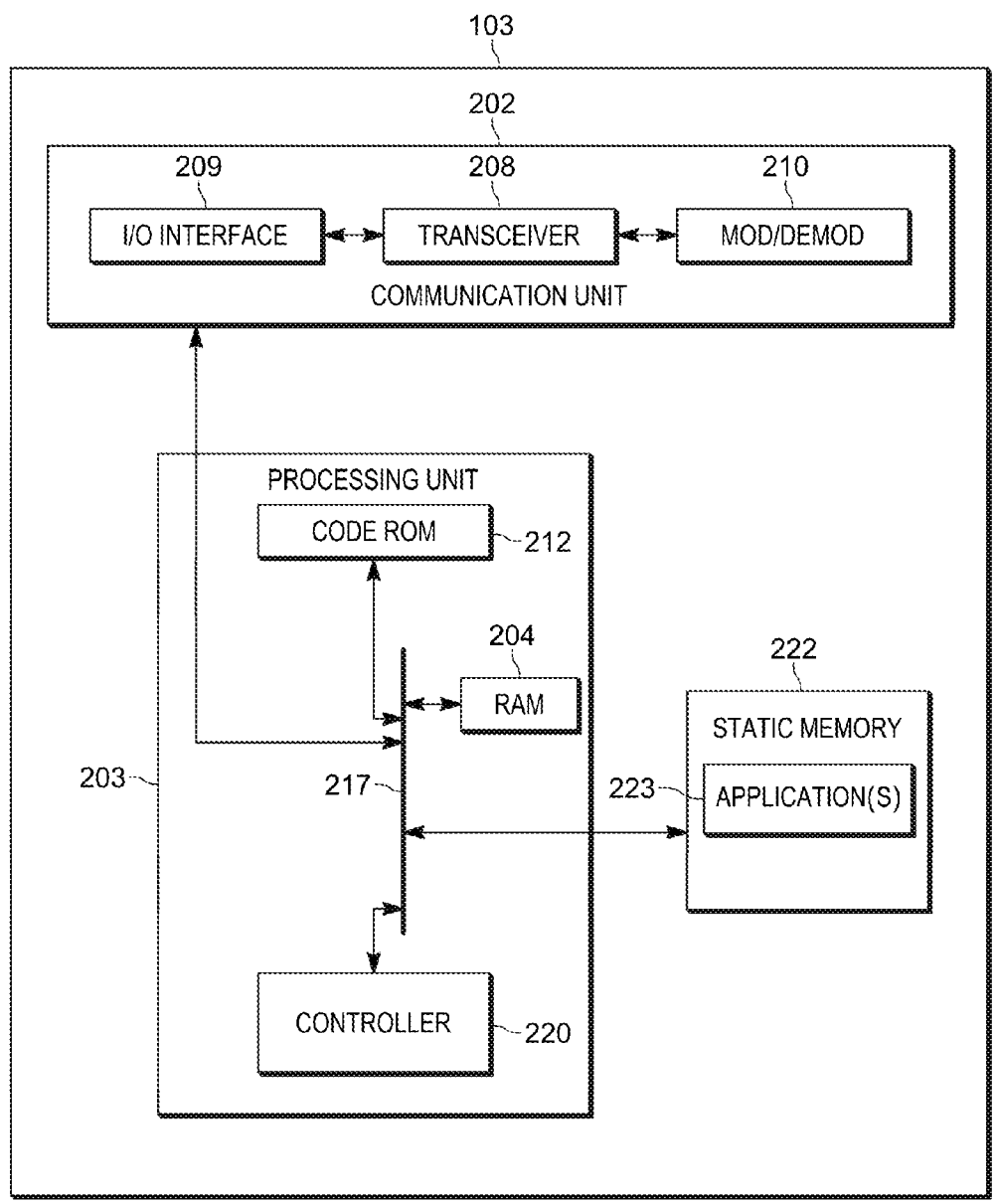
FIG. 2 is a device diagram showing an example device structure of a device for resolving misunderstandings on channels, in accordance with some examples.

Attention is next directed to FIG. 2, which depicts a schematic block diagram of an example of the device 101. In general, the device 101 may comprise any suitable combination of one or more server devices and/or cloud-based devices and/or call-processing devices, and the like, configured to set up channels between the communication devices 103, and monitor communications on such channels. However, the device 101 may be provided in any suitable format including, but not limited to, one or more of a personal computing device, a laptop computing device, and the like, and, in some examples, a portion of functionality described with respect to the device 101 may be incorporated into one or more of the communication devices 103. For example, one or more of the communication devices 103 may one or more of: monitor communications received via channels; determine misunderstandings and/or information to resolve such misunderstandings; and provide the information on a channel (e.g. effectively controlling other communication devices 103 to provide the information); however, channel set up may be performed by the device 101.

As depicted, the device 101 comprises: a communication unit 202, a processing unit 203, a Random-Access Memory (RAM) 204, a transceiver 208, one or more wired and/or wireless input/output (I/O) interfaces 209, a modulator/demodulator 210, a code Read Only Memory (ROM) 212, a common data and address bus 217, a controller 220, and a static memory 222 storing at least one application 223. Hereafter, the at least one application 223 will be interchangeably referred to as the application 223. Furthermore, while the memories 204, 212 are depicted as having a particular structure and/or configuration, (e.g. separate RAM 204 and ROM 212), memory of the device 101 may have any suitable structure and/or configuration While not depicted, the device 101 may include, but is not limited to, one or more input devices, one or more display screens, one or more microphones and one or more speakers, such that a user may interact with the device 101.

As shown in FIG. 2, the device 101 includes the communication unit 202 communicatively coupled to the common data and address bus 217 of the processing unit 203.

The processing unit 203 may include the code Read Only Memory (ROM) 212 coupled to the common data and address bus 217 for storing data for initializing system components. The processing unit 203 may further include the controller 220 coupled, by the common data and address bus 217, to the Random-Access Memory 204 and the static memory 222. Furthermore, in some examples, the memory 222 may comprise the memory 107 and/or the information 109.

The communication unit 202 may include one or more wired and/or wireless input/output (I/O) interfaces 209 that are configurable to communicate with other components of the system 100. For example, the communication unit 202 may include one or more transceivers 208 and/or wireless transceivers for communicating with other suitable components of the system 100. Hence, the one or more transceivers 208 may be adapted for communication with one or more communication links and/or communication networks used to communicate with the other components of the system 100. For example, the one or more transceivers 208 may be adapted for communication with one or more of the Internet, a digital mobile radio (DMR) network, a Project 25 (P25) network, a terrestrial trunked radio (TETRA) network, a Bluetooth network, a Wi-Fi network, for example operating in accordance with an IEEE 802.11 standard (e.g., 802.11a, 802.11b, 802.11g), an LTE (Long-Term Evolution) network and/or other types of GSM (Global System for Mobile communications) and/or 3GPP (3rd Generation Partnership Project) networks, a 5G network (e.g. a network architecture compliant with, for example, the 3GPP TS 23 specification series and/or a new radio (NR) air interface compliant with the 3GPP TS 38 specification series) standard), a Worldwide Interoperability for Microwave Access (WiMAX) network, for example operating in accordance with an IEEE 802.16 standard, and/or another similar type of wireless network. Hence, the one or more transceivers 208 may include, but are not limited to, a cell phone transceiver, a DMR transceiver, P25 transceiver, a TETRA transceiver, a 3GPP transceiver, an LTE transceiver, a GSM transceiver, a 5G transceiver, a Bluetooth transceiver, a Wi-Fi transceiver, a WiMAX transceiver, and/or another similar type of wireless transceiver configurable to communicate via a wireless radio network.

The communication unit 202 may further include one or more wireline transceivers 208, such as an Ethernet transceiver, a USB (Universal Serial Bus) transceiver, or similar transceiver configurable to communicate via a twisted pair wire, a coaxial cable, a fiber-optic link, or a similar physical connection to a wireline network. The transceiver 208 may also be coupled to the combined modulator/demodulator 210.

The communication unit 202 may optionally include one or more wireline transceivers, such as an Ethernet transceiver, a USB (Universal Serial Bus) transceiver, or similar transceiver configurable to communicate via a twisted pair wire, a coaxial cable, a fiber-optic link, or a similar physical connection to a wireline network.

The controller 220 may include ports (e.g. hardware ports) for coupling to other hardware components.

The controller 220 may include one or more logic circuits, one or more processors, one or more microprocessors, and/or the controller 220 may include one or more ASIC (application-specific integrated circuits) and one or more FPGA (field-programmable gate arrays), and/or another electronic device. In some examples, the controller 220 and/or the device 101 is not a generic controller and/or a generic device, but a device specifically configured to implement functionality for resolving misunderstandings on channels. For example, in some examples, the device 101 and/or the controller 220 specifically comprises a computer executable engine configured to implement functionality for resolving misunderstandings on channels.

The static memory 222 is a non-transitory machine readable medium that stores machine readable instructions to implement one or more programs or applications. Example machine readable media include a non-volatile storage unit (e.g. Erasable Electronic Programmable Read Only Memory ("EEPROM"), Flash Memory) and/or a volatile storage unit (e.g. random-access memory ("RAM")). In the example of FIG. 2, programming instructions (e.g., machine readable instructions) that implement the functional teachings of the device 101 as described herein are maintained, persistently, at the memory 222 and used by the controller 220 which makes appropriate utilization of volatile storage during the execution of such programming instructions.

Figure 3:
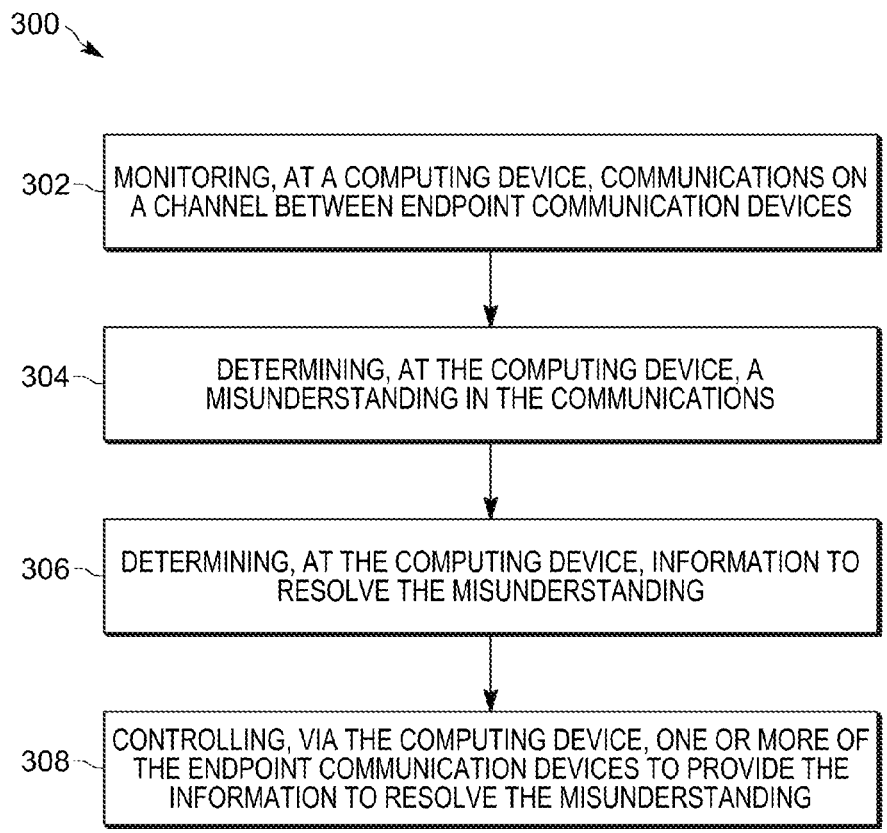
FIG. 3 is a flowchart of an example method for resolving misunderstandings on channels, in accordance with some examples.

In particular, the memory 222 stores instructions corresponding to the at least one application 223 that, when executed by the controller 220, enables the controller 220 to implement functionality for resolving misunderstandings on channels including, but not limited to, the blocks of the method set forth in FIG. 3.

In illustrated examples, when the controller 220 executes the one or more applications 223, the controller 220 is enabled to: monitor, via the communication unit, communications on a channel between communication devices; determine a misunderstanding in the communications; determine information to resolve the misunderstanding; and control, via the communication unit, one or more of the communication devices to provide the information to resolve the misunderstanding.

The application 223 may include programmatic algorithms, and the like, to implement functionality as described herein and which may include, but is not limited to, a programmatic determination of misunderstandings in communications and/or a programmatic determination of information to resolve misunderstandings in communications. Such programmatic algorithms may include, but are not limited to, lists of keywords and/or associated keywords, which may occur in communications (e.g. either via text and/or audio, and which may be identified via a speech-to-text module of the application 223) and which may indicate misunderstandings. For example, the terms "house" and "building", and/or "red" and "red-colored" used by an operator of a communication device 103 in various communications on the channel 105 in describing a location (e.g. "It's a red house" and "Like I said, it's a red-colored building") may indicate a misunderstanding. However, keywords (which may include key phrases) such as "I don't understand you", "Can you repeat that", may also indicate misunderstandings. Such keywords may be stored at the memory 222, for example as a module of the application 223.

Alternatively, and/or in addition to programmatic algorithms, the application 223 may include one or more machine learning algorithms to implement functionality as described herein including, but not limited to, determining misunderstandings in communications, and machine learning classifiers therefor, and/or determining information to resolve misunderstandings in communications, and machine learning classifiers therefor. In these examples, it is understood that the device 101 may be operated in a machine learning training mode to provide feedback for training the machine learning algorithms (e.g. based on the information 109); for example, communication data that caused a misunderstanding, and the information that resolved the misunderstanding may be uploaded by the communication devices 103 to the memory 107 as the information 109, which may be used to generate and/or update machine learning classifiers for one or more of: determining misunderstandings in communications; and determining information to resolve misunderstandings in communications.

The one or more machine learning models and/or algorithms of the application 223 may include, but are not limited to: a deep-learning based algorithm; a neural network; a generalized linear regression algorithm; a random forest algorithm; a support vector machine algorithm; a gradient boosting regression algorithm; a decision tree algorithm; a generalized additive model; evolutionary programming algorithms; Bayesian inference algorithms, reinforcement learning algorithms, and the like. However, generalized linear regression algorithms, random forest algorithms, support vector machine algorithms, gradient boosting regression algorithms, decision tree algorithms, generalized additive models, and the like may be preferred over neural network algorithms, deep learning algorithms, evolutionary programming algorithms, and the like, in some public-safety environments. Any suitable machine learning algorithm and/or deep learning algorithm and/or neural network is within the scope of present examples.

While details of the communication devices 103 and the server 111 are not depicted, such components of the system 100 are understood to have structures similar to that of the device 101 as depicted in FIG. 2, but adapted for their respective functionality. For example, the communication devices 103 are configured for operators thereof to exchange communication data (e.g. text, audio, video, and the like) over channels, including, but not limited to, the channel 105, for example, via a suitable messaging application and/or communication application (including, but not limited to, a talkgroup application); as such, the communication devices 103 may include suitable combinations of input/output devices for receiving, transmitting, and providing such communication data including, but not limited to, any suitable combination of one or more of a display screen, a touch screen, a speaker, a microphone, a keyboard (e.g. which may be physical and/or provided at a touch screen), a pointing device, and the like. In some examples, a communication device 103 may include a location determining device such as GPS device, and the like, to determine geographic coordinates thereof. Similarly, the server 111 is generally configured to provide application data (e.g. addresses, maps, street-views, social media data, police records, and the like) for applications/apps at the communication devices 103.

Attention is now directed to FIG. 3, which depicts a flowchart representative of a method 300 for resolving misunderstandings on channels. The operations of the method 300 of FIG. 3 correspond to machine readable instructions that are executed by the device 101, and specifically the controller 220 of the device 101. In the illustrated example, the instructions represented by the blocks of FIG. 3 are stored at the memory 222 for example, as the application 223. The method 300 of FIG. 3 is one way in which the controller 220 and/or the device 101 and/or the system 100 may be configured. Furthermore, the following discussion of the method 300 of FIG. 3 will lead to a further understanding of the system 100, and its various components.

The method 300 of FIG. 3 need not be performed in the exact sequence as shown and likewise various blocks may be performed in parallel rather than in sequence. Accordingly, the elements of method 300 are referred to herein as "blocks" rather than "steps." The method 300 of FIG. 3 may be implemented on variations of the system 100 of FIG. 1, as well.

At a block 302, the controller 220 and/or the device 101 monitors communications on the channel 105 between the communication devices 103. For example, the controller 220 and/or the device 101 generally receives text data, audio data, video data and/or any other communication data exchanged between the communication devices 103 on the channel 105 and analyzes such communication data.

In particular at a block 304, the controller 220 and/or the device 101 determines a misunderstanding in the communications, for example, by analyzing the communication data exchanged between the communication devices 103 on the channel 105.

In some examples, the controller 220 and/or the device 101 may be configured to determine the misunderstanding in the communications by determining that a description and/or descriptor of one or more of an object, a person, and a location, identified in data exchanged in the communications, is one or more of: repeated and/or ambiguous and/or contradictory in the communications. For example, as described above, text data and/or audio data on the channel 105 may include repeated descriptions and/or repeated descriptors and/or ambiguous descriptions and/or ambiguous descriptors and/or contradictory descriptions and/or contradictory descriptors of a building (e.g. a red house vs a red-colored office building) and the like, which may be used to determine a misunderstanding. Similarly, repeated descriptions and/or repeated descriptors and/or ambiguous descriptions and/or ambiguous descriptors and/or contradictory descriptions and/or contradictory descriptors of a person (e.g. "I'm chasing a short guy wearing a sport jacket" and then later "The guy is wearing a rain coat") may be used to determine a misunderstanding. Indeed, any repeated descriptions and/or repeated descriptors and/or ambiguous descriptions and/or ambiguous descriptors and/or contradictory descriptions and/or contradictory descriptors may be used to determine a misunderstanding. Furthermore, the term "ambiguous", while a relative term, may be understood to mean descriptions and/or descriptors (e.g. words in text and/or audio and/or video) of a same object, or a same person, or a same location that are provided using different words and/or adjectives, and the like, and/or contradictory words and/or adjectives ("The person I'm chasing is a short male" vs. "No, I think the person I'm chasing is actually a tall female disguised as a male, and she's hunched over", and the like).

In some examples, the controller 220 and/or the device 101 may be configured to determine the misunderstanding in the communications by determining that keywords that indicate misunderstandings appear in the communications. For example, the keywords may indicate ambiguous and/or contradictory descriptors and/or words, however keywords such as "I don't understand you" may also indicate misunderstandings.

In some examples, the controller 220 and/or the device 101 may be configured to determine a misunderstanding in the communications on the channel 105 via confidence scores, the confidence scores assigned using any suitable scheme. For example, the controller 220 and/or the device 101 may assign a confidence score (e.g. a misunderstanding confidence score) to data and/or communication data exchanged in communications on the channel 105 using any suitable scheme and/or weighting scheme. In general such a confidence score may comprise a score between 0% and 100%, and the like, of an estimation of a misunderstanding occurring in communications on the channel 105. For example descriptors of people related to gender and/or height which are ambiguous and/or contradictory may be assigned a lower weight and/or a lower confidence score than descriptors of clothing which are ambiguous and/or contradictory. Similarly, keywords such as "I don't understand you" may be assigned a higher weight and/or a higher confidence score than ambiguous and/or contradictory descriptors. In general, the controller 220 and/or the device 101 may be further configured to: compare the confidence score with a confidence threshold and/or a misunderstanding threshold; and in response to determining that the confidence score meets the confidence threshold, identify the data, exchanged in the communications, as causing the misunderstanding. For example, when the confidence score comprise a score between 0% and 100%, the confidence threshold and/or a misunderstanding threshold may be set at 80%, 90% and/or any other suitable value, and when the confidence score is greater than the confidence threshold, the controller 220 and/or the device 101 may determine that confidence score meets the confidence threshold and that a misunderstanding has occurred on the communications on the channel 105. However, any suitable score-based scheme and/or threshold-based scheme may be used to determine a misunderstanding in the communications on the channel 105.

At a block 306, the controller 220 and/or the device 101 determines information to resolve the misunderstanding.

In some examples, the controller 220 and/or the device 101 may determine information to resolve the misunderstanding using machine learning algorithms, as described above.

In some examples, the controller 220 and/or the device 101 may determine information to resolve the misunderstanding by: accessing one or more of a memory and a database (e.g. the memory 107) storing the information (e.g. the information 109 and/or a subset thereof), based on data (e.g. communication data), exchanged in the communications, identified as causing the misunderstanding.

For example, text data (e.g. text messages), provided in a text chat on the channel 105, that causes a misunderstanding may be from one of the communication devices 103 operated by a particular operator; the controller 220 and/or the device 101 may access the information 109 at the memory 107 and determine that similar historical text messages by the particular operator (and/or another operator) caused a similar misunderstanding, and a subset of the information 109 may include information which resolved the similar misunderstanding. For example, the communication data on the channel 105 may indicate that a particular operator is describing (e.g. via text messages) a suspect as being a "tall guy" and then a "tallish guy", and that another particular operator reading such text messages keeps asking "How tall" (e.g. via text messages). The information 109 may indicate that the particular operator has used similar descriptors before, with similar responses from another operator; and the information 109 may further indicate that information of a "male about 6 feet tall" resolved the previous misunderstanding. However the information 109 may not be associated with a particular operator.

Hence, in these examples, the controller 220 and/or the device 101 may determine information to resolve the misunderstanding by: accessing the memory 107 using the data, and the like, identified as causing the misunderstanding, for example using a database lookup. Such a database lookup may also be based on an identifier of an operator of a communication device 103 that originated the data identified as causing the misunderstanding (e.g. in such examples, such identifiers, such as a badge number, an employee number, and the like, are understood to be available to the device 101, for example when the communication devices 103 register with the device 101 as described above). The database lookup, and the like, may return a subset of the information 109 that resolved a previous similar misunderstanding (e.g. for a particular operator and/or independent of operators).

However, determining the information to resolve the misunderstanding may occur in any suitable manner. For example, the misunderstanding may comprise repeated and/or ambiguous and/or contradictory descriptors of a location, such as "I'm at the corner of $5^{th}$ and Main, or maybe $6^{th}$ and Main, I don't know, there are garbage containers". The controller 220 and/or the device 101 may determine information to resolve the misunderstanding by: determining geographic coordinates (e.g. GPS coordinates), and the like, of the communication device 103 that originated the data that resulted in the misunderstanding, for example by querying the communication device 103 that originated the data for the geographic coordinates and/or by receiving the geographic coordinates in metadata on the channel 105. The controller 220 and/or the device 101 may further communicate with the server 111 to obtain an address (e.g. a street address) and/or a map (which may include directions to the geographic coordinates), and/or an image of a street-view that corresponds to the geographic coordinates.

At a block 308, the controller 220 and/or the device 101 controls one or more of the communication devices 103 to provide the information to resolve the misunderstanding.

In some examples, the controller 220 and/or the device 101 may control one or more of the communication devices 103 to provide the information to resolve the misunderstanding by: providing the information to one or more of the communication devices 103 on the channel 105. For example, the information to resolve the misunderstanding may be provided on the channel 105 as communication data in any format suitable for and/or compatible with the channel 105. For example, when the channel 105 includes text data and/or text messages, the information to resolve the misunderstanding may be provided as text data and/or a text message on the channel 105 (e.g. which may be identified on the channel 105 as originating from the device 101 and/or a "bot" and the like). For example, continuing with the examples above, text data and/or a text message of a "a tall guy or tallish guy may mean a male about 6 feet tall" may be provided in response to descriptions of a "tall guy" and a "tallish guy" in the text data. Further continuing with the examples above, geographic coordinates and/or a corresponding address and/or a map and/or an image of a corresponding street-view of the geographic coordinates may be provided in response to repeated and/or ambiguous and/or contradictory descriptors of a location; in these examples, it is understood that a map and/or an image of a corresponding street-view is provided when a format of the channel 105 supports providing of maps and/or images (e.g. the channel 105 may comprise an MMS channel, and the like).

Regardless, the information to resolve the misunderstanding is provided at one or more of the communication devices 103 may be provided at any suitable messaging application and/or communication application (including, but not limited to, a talkgroup application) being used to send and receive communication data via the channel 105.

In some examples, the controller 220 and/or the device 101 may control one or more of the communication devices 103 to provide the information to resolve the misunderstanding by one or more of: controlling one or more of the communication devices 103 to provide the information at an application outside the channel 105; and controlling one or more of the communication devices 103 to open the application to provide the information.

For example, when the information to resolve the misunderstanding comprises geographic coordinates, the controller 220 and/or the device 101 may provide the geographic coordinates on the channel 105 with a command, and the like, to cause the one or more of the communication devices 103 to open a map application, and the like, and provide the geographic coordinates in the map application, for example in the form of a map at and/or around the geographic coordinates. Such examples may include the one or more communication devices 103, that receive the geographic coordinates, requesting the map from the application server 111. In some of these examples, the geographic coordinates may be provided in the form of a link to the map at the application server 111, which is opened via a browser application at the one or more communication devices 103.

While such examples are described with respect to the information that resolves the misunderstanding being in the form of geographic coordinates, and the application at one or more communication devices 103 being in the form of a map application and/or a browser application, the information that resolves the misunderstanding may comprise any suitable information, and the application for providing such information may be any suitable application. For example, the information may comprise a name of a suspect being chased by an operator of a communication device 103, and the application may comprise an incident application for providing police records (e.g. from police databases) of persons, and/or a medical application for providing medical records (e.g. from medical databases) of persons, and/or a social media application for providing social media data of persons based on names and the like.

Furthermore, such applications are referred to as being "outside" the channel 105 as information provided in such applications may not be viewable in the communications of the channel 105 and/or are provided external to the channel 105. Furthermore, in some examples, the controller 220 and/or the device 101 may control one or more of the communication devices 103 to provide the information to resolve the misunderstanding by transmitting the information to one or more of the communication devices 103 at a channel different from the channel 105 (e.g. and/or a channel used to provide information for applications, and the like).

In yet further examples, the device 101 may retrieve information to resolve the misunderstanding from the server 111, such as a map and/or a street-view and/or social media data and/or police records and/or medical records, and transmit the information retrieved from the server 111 to one or more of the communication devices 103 (e.g. to control the one or more of the communication devices 103 to provide the information).

In some examples, the controller 220 and/or the device 101 may further determine a subset of the communication devices 103 associated with the misunderstanding. For example, while more than two communication devices 103 may be communicating on a channel, a misunderstanding may be identified on the basis of communication data originating from two of the communication devices 103. With brief reference back to FIG. 1, operators of the communication devices 103-3, 103-4 may be posting text messages on the channel 105 regarding arranging a social visit, while an operator of the communication device 103-1 may be posting text messages regarding chasing a suspect, and the operator of the communication device 103-2 may be posting responsive text messages asking questions about the chase; as such, the controller 220 and/or the device 101 may identify the communication devices 103-1, 103-2 as comprising a subset of the communication devices 103 associated with the misunderstanding. In these examples, the controller 220 and/or the device 101 may control one or more of the communication devices 103 to provide the information to resolve the misunderstanding by one or more of: controlling a subset of the communication devices 103 associated with the misunderstanding by one or more of: providing the information at an application outside the channel 105 at the subset of the communication devices 103 associated with the misunderstanding; and controlling the subset of the communication devices 103 associated with the misunderstanding to open the application to provide the information. For example, the information may be transmitted to the communication devices 103-1, 103-2 and/or the communication device 103-2 (e.g. as it is the operator of the communication device 103-2 that is attempting to responding to communication data from the communication device 103-1 that is causing the misunderstanding), at a channel different from the channel 105, as described above; in these examples, the communication devices 103-3, 103-4 may not receive the information to resolve the misunderstanding.

Hence, the subset of the communication devices 103 identified as being associated with the misunderstanding and which are controlled to provide information determined to resolve the misunderstanding may include one of the communication devices 103, two of the communication devices 103 and/or more than two of the communication devices 103.

In yet further examples in which the device 101 identifies a subset of the communication devices 103 associated with the misunderstanding, the device 101 may cause an additional channel to be opened between the communication devices 103 of the subset to assist at resolving the misunderstanding.

In particular, the method 300 may further include the controller 220 and/or the device 101 opening an additional channel between a subset of the communication devices 103, the additional channel having a format different from the channel 105, the additional channel 105 to assist at resolving the misunderstanding. For example, as described above, different formats of channels (e.g. text, audio, video, and the like) have different disadvantages that may cause misunderstandings. When, for example, the misunderstanding is identified at text data, and the like (e.g. the channel 105 may comprise a text channel and/or an MMS channel and/or communication data on the channel 105 may occur via text messages and the like), the method 300 may further include the controller 220 and/or the device 101 opening an audio channel and/or a video channel between a subset of the communication devices 103 associated with the misunderstanding.

In particular examples, where the channel 105 comprises one or more of text channel and an audio channel, the method 300 may further include the controller 220 and/or the device 101: opening a video channel between a subset of the communication devices 103 to assist at resolving the misunderstanding. Hence, continuing with the example where the communication devices 103-1, 103-2 are identified as being associated with a misunderstanding, the device 101 may cause a video channel to be opened between the communication devices 103-1, 103-2 such that operators thereof may conduct a video chat and/or exchange video data, to resolve the misunderstanding; such control may occur via the device 101 exchanging channel control messages with infrastructure in the network 102 and the communication devices 103-1, 103-2. However, in other examples, when the channel 105 comprises a video channel, the controller 220 and/or the device 101 may open a text channel or an audio channel between the subset of the communication devices 103 to assist at resolving the misunderstanding. Similarly, in other examples, when the channel 105 comprises an audio channel, the controller 220 and/or the device 101 may open a text channel or a video channel between the subset of the communication devices 103 to assist at resolving the misunderstanding.

In particular, it is understood that the channel 105 generally comprises a given format, and that the method 300 may further comprise the controller 220 and/or the device: identifying data (e.g. communication data), exchanged in the communications between a subset of the communication devices 103 on the channel 105, as causing the misunderstanding; identifying a different format, different from the given format, suitable for exchanging data to resolve the misunderstanding; and opening an additional channel, having the different format, between the subset of the communication devices 103. For example, an audio channel and/or a video channel may be suitable for exchanging audio data and/or video data to resolve a misunderstanding that is determined from text data. However, a text channel may be suitable for exchanging text data to resolve a misunderstanding that is based on audio data and/or video data (e.g. due to environmental noise and/or bandwidth issues).

In some examples, the communication devices 103 of the subset that are communicating on the additional channel may remain on the channel 105; however, in other examples, communication devices 103 of the subset that are communicating on the additional channel may be removed from the channel 105, for example until communication on the additional channel ends, and/or the additional channel is closed.

In particular, the method 300 may further comprise the controller 220 and/or the device 101: in response to opening the additional channel: removing the subset of the communication devices 103 from the channel 105; and, thereafter, in response to determining that the additional channel has been closed: adding the subset of the communication devices 103 back to the channel 105.

Examples of the method 300 will next be described with respect to FIG. 4, FIG. 5, and FIG. 6, which are similar to FIG. 1, with like components having like numbers.

Figure 4:
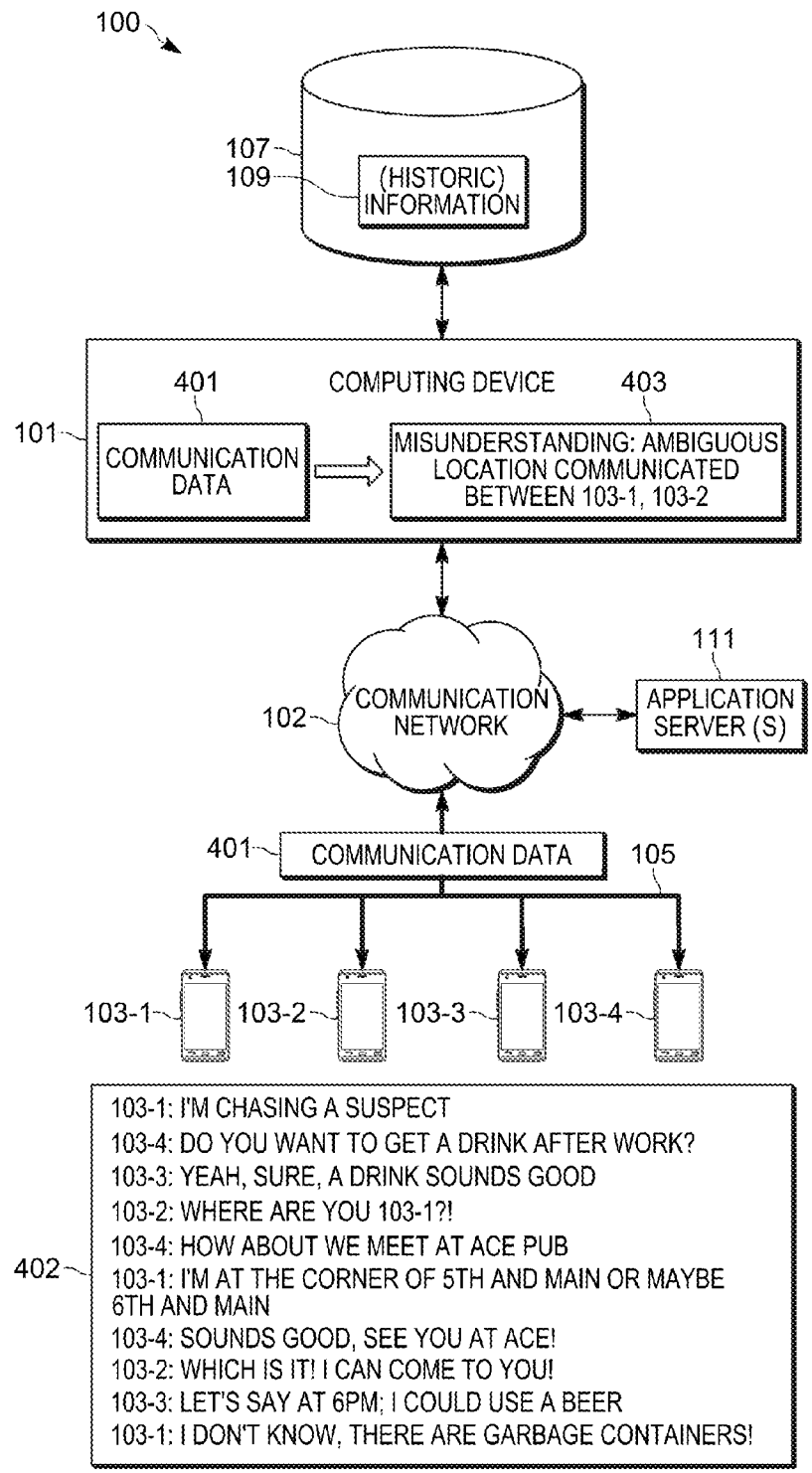
FIG. 4 depicts the example system of FIG. 1 implementing an example method for resolving misunderstandings on channels, in accordance with some examples.

FIG. 4 depicts communications, and in particular communication data 401, being exchanged on the channel 105 in the form of text messages in a group text chat (e.g. on a talkgroup and the like), with a text message preceded by an identifier of a communication device 103 which transmitted the text message (e.g. "103-1", "103-2", "103-3", "103-4"). For example, the communication data 401 may be provided at a window 402 of respective display screens of the communication devices 103 (e.g. the window 402 shown beneath the communications devices 103 in FIG. 4 to indicate that the window 402 may be provided at the display screens of the communication devices 103). As depicted, the communication data 401 is also received at the device 101 which monitors (e.g. at the block 302 of the method 300) the communication data 401.

In particular, in group text chat of the communication data 401, as depicted in the window 402, operators of the communication devices 103-3, 103-4 are communicating regarding meeting up after work for drinks, as represented by text messages: "103-4: Do you want to get a drink after work?", "103-3: yeah, sure, a drink sounds good", "103-4: how about we meet at Ace Pub", "103-4: Sounds good, see you at Ace!", "103-3: Let's say at 6 pm; I could use a beer".

In the same group chat of the communication data 401, as depicted in the window 402, the operator of the communication device 103-1 is communicating about chasing a suspect, while the operator of the communication device 103-2 is responding to the operator of the communication device 103-1, as represented by text messages: "103-1: I'm chasing a suspect", "103-2: where are you 103-1?!", "103-1: I'm at the corner of 5th and Main or maybe 6th and Main", "103-2: Which is it! I can come to you!", "103-1: I don't know, there are garbage containers!".

As depicted, the device 101 receives the communication data 401 and determines (e.g. at the block 304 of the method 300) that there is a misunderstanding 403 regarding an ambiguous location in the communication data 401, and in particular a location of the communication device 103-1 and/or an operator thereof.

As depicted, the device 101 further identifies the communication devices 103-1, 103-2 as being in a subset of the communication devices 103 associated with the misunderstanding 403. For example text messages from the communication device 103-1 include an ambiguous location, and text messages from the communication device 103-2 indicates attempts to understand where the ambiguous location might be. Hence, the device 101 determines that the communication devices 103-1, 103-2 are in a subset of the communication devices 103 associated with the misunderstanding 403, while the communication devices 103-3, 103-4 are not in the subset as text messages from the communication devices 103-3, 103-4 appear to be regarding another topic entirely.

Figure 5:
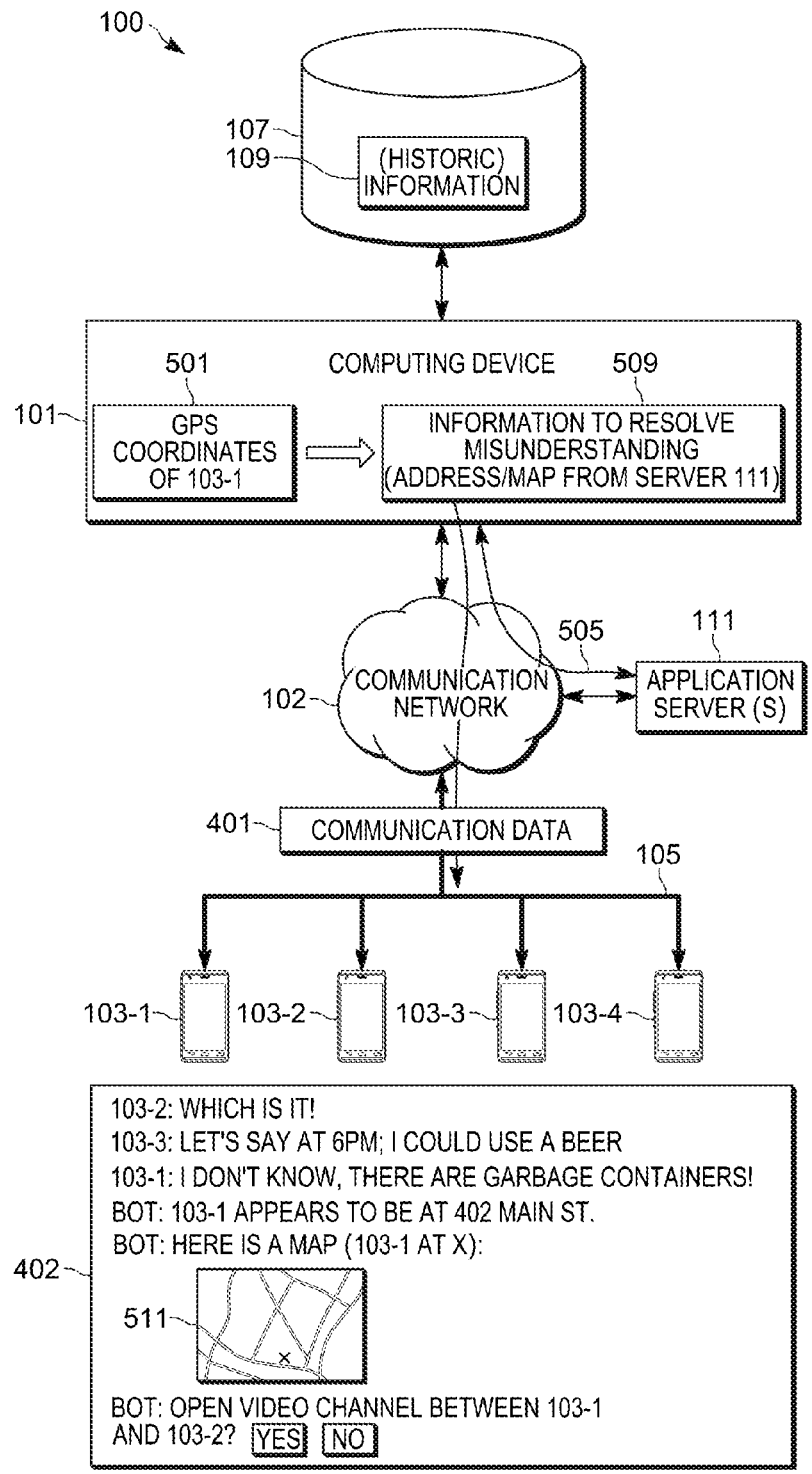
FIG. 5 depicts the example system of FIG. 1 continuing to implement the example method for resolving misunderstandings on channels, in accordance with some examples.

With reference to FIG. 5, the device 101 determines GPS coordinates 501 of the communication device 103-1, for example by querying the communication device 103-1 (not depicted) and/or from metadata of the communication data 401 (e.g. the communication devices 103 may include respective GPS coordinates in headers and/or metadata of respective text messages).

From the GPS coordinates 501, the device 101 may determine (e.g. at the block 306 of the method 300) information 509 to resolve the misunderstanding. As depicted, the information 509 includes an address of the communication device 103-1 and a map thereof retrieved from the server 111 (e.g. via requests/responses 505 with the server 111).

Alternatively (not depicted), the device 101 may determine the information 509 to resolve the misunderstanding via the information 509 stored at the memory 107 (e.g. which may indicate information similar to the information 509 previously used to resolve a misunderstanding about a location that include "garbage containers" near "5th and Main" and/or "6th and Main").

Also depicted in FIG. 5, the device 101 further controls (e.g. at the block 308 of the method 300) the communication devices 103 to provide the information 509, for example by transmitting the information 509 to the communication devices 103 on the channel 105. As depicted, the information 509 appears as messages in the communication data 401 as depicted in the window 402, identified as being from a "BOT". Such messages include a text message which includes the determined address of the communication device 103-1, "BOT:103-1 appears to be at 402 Main St: and BOT". Such messages include a map 511 of the determined address of the communication device 103-1 (e.g. which is provided with a text message: "BOT: Here is a map (103-2 at X):".

As depicted, the device 101 further provides actuatable options in the communication data 401, as depicted in the window 402, in the form of a "YES" button for opening a video channel between the communication devices 103-1, 103-2, and a "NO" button. When the actuatable option "NO"

is actuated, no action is taken by the device 101. However, when the actuatable option "YES" is actuated at one or more of the communication devices 103-1, 103-2, (e.g. via a respective touch screen and the like), a video channel is opened by the device 101. Such a video channel may not be opened when the actuatable option "YES" is actuated at the communication devices 103-3, 103-4, as the communication devices 103-1, 103-2 are in a subset associated with the misunderstanding 403, while the communication devices 103-3, 103-4 are not in the subset.

Figure 6:
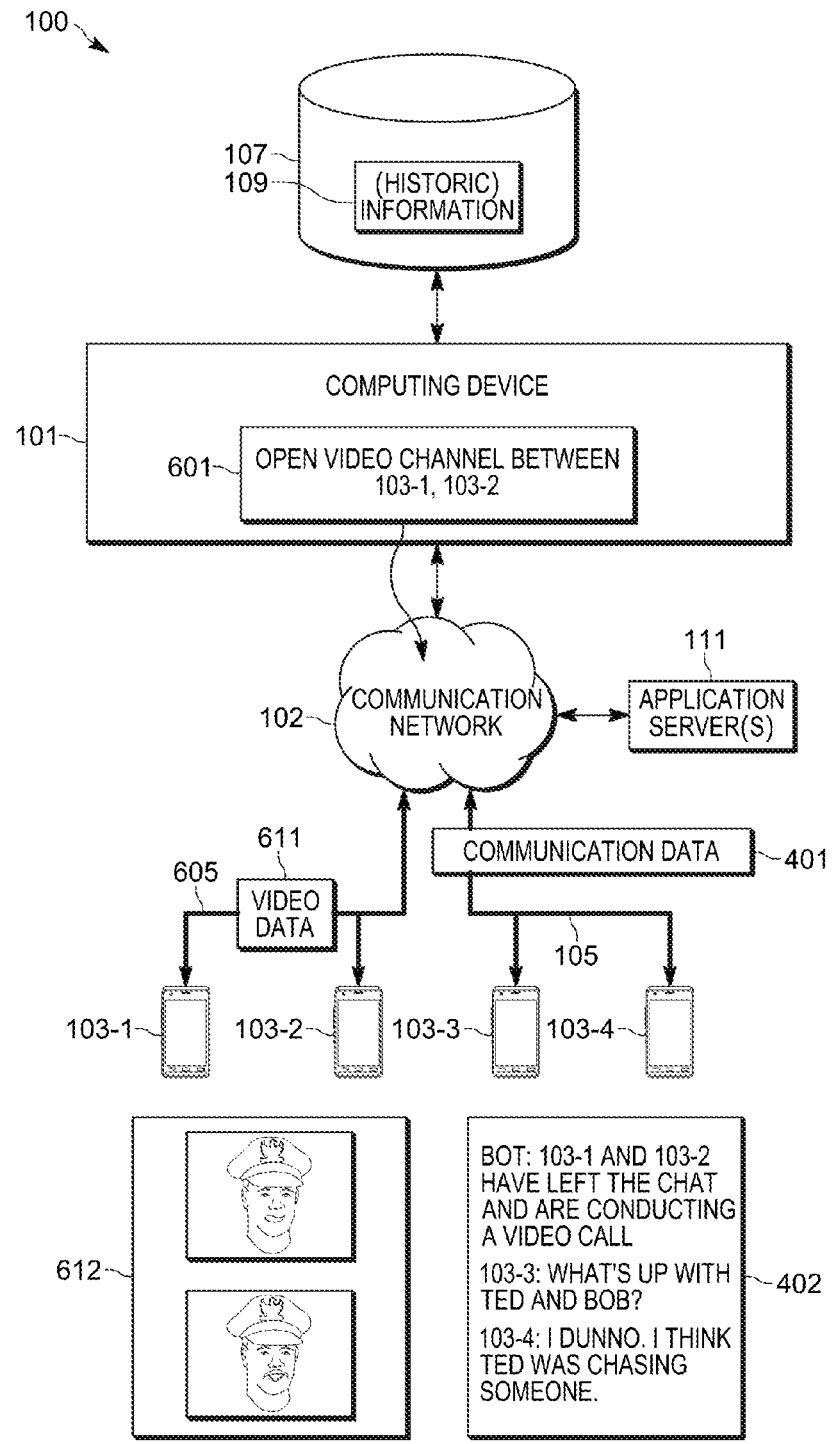
FIG. 6 depicts the example system of FIG. 1 continuing to implement the example method for resolving misunderstandings on channels, in accordance with some examples.

However, attention is next directed to FIG. 6 which depicts the system 100 when the actuatable option "YES" is actuated. While not depicted, the device 101 is understood to receive an indication of such an actuation, and the device 101 responsively generates a control message 601 to open a video channel between the communication devices 103-1, 103-2, which is transmitted to infrastructure of the network 102 to set up such a video channel.

For example, as depicted an additional channel 605 (e.g. a video channel) is setup between the communication devices 103-1, 103-2 over which video data 611 is exchanged (e.g. via video call and/or a video windows 612, and the like, at display screens thereof). As depicted in FIG. 6, a video window 612 of display screens of the communication devices 103-1, 103-2, showing the video data 611, is adjacent the communication devices 103-1, 103-2, but not the communication devices 103-3, 103-4, indicating that the video data 611 is exchanged on the additional channel 605 between the communication devices 103-1, 103-2 (but not between the communication devices 103-3, 103-4). In the video data 611, as depicted in the video window 612, the operators of the communication devices 103-1, 103-2 may talk and/or exchange video and/or audio to resolve the misunderstanding 403.

Furthermore, as depicted, the communication devices 103-1, 103-2 are removed from the channel 105, for example until the additional channel 605 is closed, and then the communication devices 103-1, 103-2 may be responsively added back to the channel 105, though actuatable options (similar to as described above with respect to the "YES" and "NO" buttons) for returning to the channel 105 may be provided at the communication devices 103-1, 103-2 when the additional channel 605 is closed. For example, the additional channel 605 may be closed when a video call represented by the video data 611 ends via an action at one or more of the communication devices 103-1, 103-2.

As also depicted, the channel 105 continues to be maintained between the communication devices 103-3, 103-4, and the communication data 401 continues to be exchanged therebetween, as depicted in the window 402, however the communication devices 103-1, 103-2 are removed from the channel 105 (e.g. with the device 101 indicating the removal via a text message "BOT: 103-1 and 103-2 have left the chat and are conducting a video call"). As depicted in FIG. 6, the window 402 showing the communication data 401 is adjacent the communication devices 103-3, 103-4 but not the communication devices 103-1, 103-2, indicating that the communication data 401 is now exchanged on the channel 105 between the communication devices 103-3, 103-4 (but not between the communication devices 103-1, 103-2).

In other examples, however, the communication devices 103-1, 103-2 may remain on the channel 105 while also on the additional channel 605.

As should be apparent from this detailed description above, the operations and functions of computing devices described herein are sufficiently complex as to require their implementation on a computer system, and cannot be performed, as a practical matter, in the human mind. Computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., among other features and functions set forth herein).

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

In this document, language of "at least one of X, Y, and Z" and "one or more of X, Y and Z" may be construed as X only, Y only, Z only, or any combination of two or more items X, Y, and Z (e.g., XYZ, XY, YZ, XZ, and the like). Similar logic may be applied for two or more items in any occurrence of "at least one . . . " and "one or more . . . " language.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "sub stanti ally", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A method comprising:
   monitoring, at a computing device, communications on a channel between communication devices, the communications provided in a group chat on the channel;
   determining, at the computing device, a misunderstanding in the communications in the group chat, by identifying one or more of confusion, misinterpretation, miscommunications, and communication problems in the group chat based on data from different communication devices in the group chat;
   determining, at the computing device, information to resolve the misunderstanding;
   controlling, via the computing device, one or more of the communication devices to provide the information in the group chat to resolve the misunderstanding, the information provided in the group chat as originating from the computing device;
   identifying the data, exchanged in the communications between a subset of the communication devices on the channel, as having the misunderstanding, wherein the channel comprises one or more of a text channel and an audio channel;
   opening a video channel between the subset of the communication devices, wherein video data is exchanged on the video channel to resolve the misunderstanding;
   in response to opening the video channel: removing the subset of the communication devices from the one or more of the text channel and the audio channel;
   determining that the video channel has been closed when a video call represented by the video data ends via at least an action at one or more of the subset of the communication devices; and,
   in response to determining that the video channel has been closed: adding the subset of the communication devices back to the one or more of the text channel and the audio channel.

2. The method of claim 1, wherein determining the misunderstanding in the communications comprises:
   determining that a description of one or more of an object, a person, and a location, identified in the data exchanged in the communications, is one or more of: repeated in the communications; contradicted in the communications; and ambiguous in the communications.

3. The method of claim 1, wherein determining the misunderstanding in the communications comprises:
   assigning a confidence score to data exchanged in the communications;
   comparing the confidence score with a confidence threshold; and
   in response to determining that the confidence score meets the confidence threshold, identifying the data, exchanged in the communications, as causing the misunderstanding.

4. The method of claim 1, wherein determining, at the computing device, the information to resolve the misunderstanding comprises:
   accessing one or more of a memory and a database storing the information, based on the data, exchanged in the communications, identified as causing the misunderstanding.

5. The method of claim 1, wherein controlling the one or more of the communication devices to provide the information to resolve the misunderstanding comprises:
   providing the information to at least one or more of the subset of the communication devices on the channel.

6. The method of claim 1, wherein controlling the one or more of the communication devices to provide the information to resolve the misunderstanding comprises one or more of:
   controlling the one or more of the communication devices to provide the information at an application outside the channel; and
   controlling the one or more of the communication devices to open the application to provide the information.

7. A device comprising:
   a communication unit; and
   a controller configured to:
      monitor, via the communication unit, communications on a channel between communication devices, the communications provided in a group chat on the channel;
      determine a misunderstanding in the communications in the group chat, by identifying one or more of confusion, misinterpretation, miscommunications, and communication problems in the group chat based on data from different communication devices in the group chat;

determine information to resolve the misunderstanding;

control, via the communication unit, one or more of the communication devices to provide the information in the group chat to resolve the misunderstanding, the information provided in the group chat as originating from the device;

identify the data, exchanged in the communications between a subset of the communication devices on the channel, as having the misunderstanding, wherein the channel comprises one or more of a text channel and an audio channel;

open a video channel between the subset of the communication devices, wherein video data is exchanged on the video channel to resolve the misunderstanding;

in response to opening the video channel: remove the subset of the communication devices from the one or more of the text channel and the audio channel;

determine that the video channel has been closed when a video call represented by the video data ends via at least an action at one or more of the subset of the communication devices; and, in response to determining that the video channel has been closed: add the subset of the communication devices back to the one or more of the text channel and the audio channel.

8. The device of claim 7, wherein the controller is further configured to determine the misunderstanding in the communications by:

determining that a description of one or more of an object, a person, and a location, identified in the data exchanged in the communications, is one or more of: repeated in the communications; contradicted in the communications; and ambiguous in the communications.

9. The device of claim 7, wherein the controller is further configured to determine the misunderstanding in the communications by:

assigning a confidence score to data exchanged in the communications;

comparing the confidence score with a confidence threshold; and in response to determining that the confidence score meets the confidence threshold, identifying the data, exchanged in the communications, as causing the misunderstanding.

10. The device of claim 7, wherein the controller is further configured to determine the information to resolve the misunderstanding by:

accessing one or more of a memory and a database storing the information, based on the data, exchanged in the communications, identified as causing the misunderstanding.

11. The device of claim 7, wherein the controller is further configured to control the one or more of the communication devices to provide the information to resolve the misunderstanding by:

providing the information to at least one or more of the subset of the communication devices on the channel.

12. The device of claim 7, wherein the controller is further configured to control the one or more of the communication devices to provide the information to resolve the misunderstanding by one or more of:

controlling the one or more of the communication devices to provide the information at an application outside the channel; and controlling the one or more of the communication devices to open the application to provide the information.

* * * * *